(No Model.)
A. KNOBLAUCH.
STREET CAR FENDER.
No. 562,769. Patented June 23, 1896.
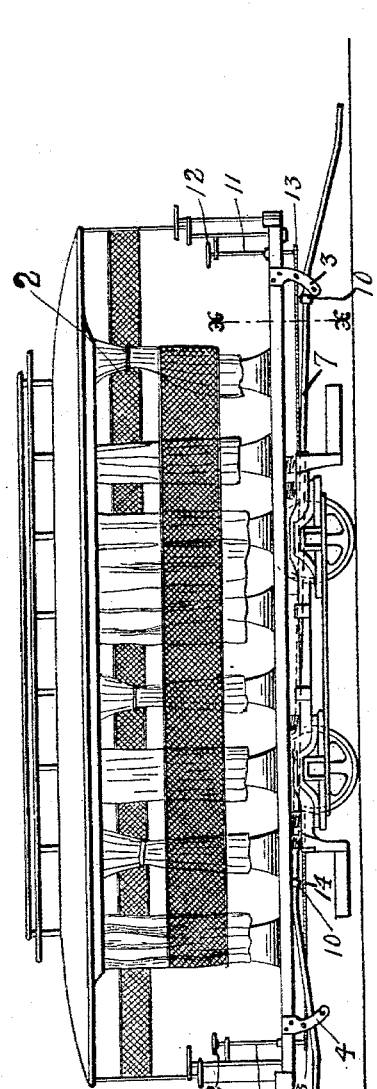
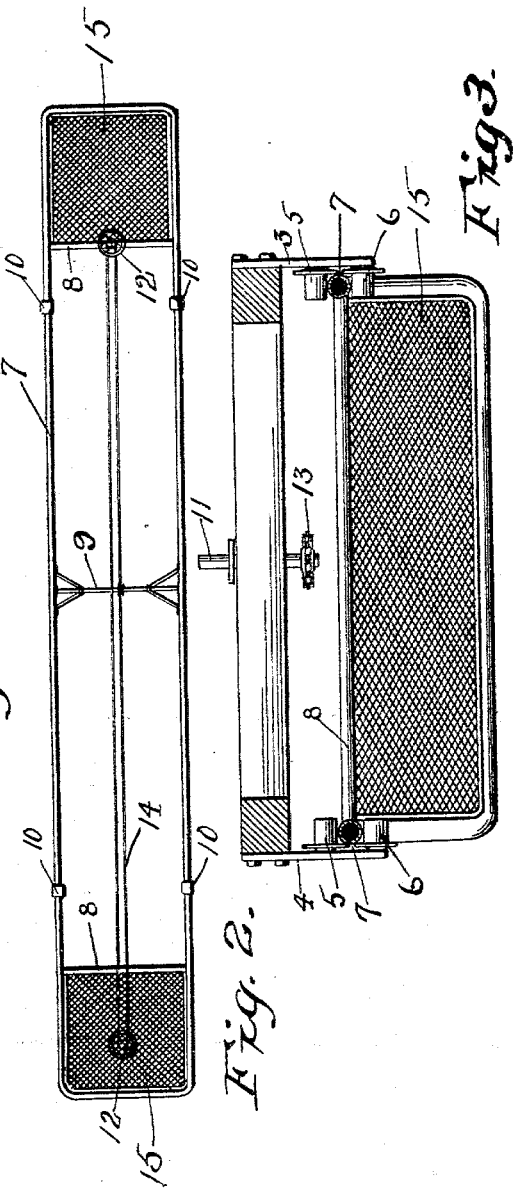
Witnesses:
C. E. Van Dorn.
Richard Paul
Inventor;
Anton Knoblauch
By Paul & Hawley
his attorneys

UNITED STATES PATENT OFFICE.

ANTON KNOBLAUCH, OF MINNEAPOLIS, MINNESOTA.

STREET-CAR FENDER.

SPECIFICATION forming part of Letters Patent No. 562,769, dated June 23, 1896.

Application filed October 5, 1895. Serial No. 564,742. (No model.)

*To all whom it may concern:*

Be it known that I, ANTON KNOBLAUCH, a citizen of the United States, residing at Minneapolis, in the county of Hennepin and State of Minnesota, have invented certain new and useful Improvements in Street-Car Fenders, of which the following is a specification.

My invention relates to devices for preventing pedestrians from being struck by a rapidly-moving electric or cable car, and the object I have in view is to provide a simple but strong and durable device which shall be under the control of the operator on the car, and which shall act as a perfect fender to prevent obstacles on the track from being thrown under the wheels of the car.

A further object is to provide a fender which may be operated from either end of the car, as may be desired.

My invention consists generally in various constructions and combinations, all as hereinafter described, and particulary pointed out in the claims.

In the accompanying drawings, forming part of this specification, Figure 1 is a side elevation of a street-car with my invention applied thereto. Fig. 2 is a plan view of the fender detached from the car. Fig. 3 is a sectional view on the line $x$ $x$ of Fig. 1.

In the drawings, 2 represents a car of the ordinary description. It is provided at each end and on the outside of the sills thereof with the hangers 3 and 4, each of which is provided upon its inner face with the rollers 5 and 6, between which the frame of the fender is supported and adapted to slide, and these hangers are adjusted to the downwardly-curved ends of the frame hereinafter described.

The fender comprises a rectangular frame 7, made preferably of tubing, such as gas-pipe, provided at a short distance from each end with cross-bars 8 and a central cross-bar 9, which is rigidly braced between the longitudinal parts of the frame. The frame is also provided near the cross-bars 8 with the stops 10, which engage the rollers provided on the inner face of the hangers and limit the travel of the fender in either direction.

At each end of the car is arranged a shaft 11, extending up through the floor of the car and provided at its upper end with a hand-wheel 12, and at its lower end with a sprocket 13, over which passes a sprocket-chain 14, having its ends secured to the middle of the cross-bar 9, as shown in Fig. 1. Between the cross-bars 8 and the ends of the frame are arranged screens 15, which may be of wire or rope, as may be desired. The ends of the frame are bent downwardly, so as to bring the extreme end near the rails, so that any obstacle on the track will be scooped up into the net and thereby prevented from being drawn under the wheels of the car, and the hangers upon which the frame is supported being adjacent to the downwardly curved or bent ends of the frame, as the frame is given a longitudinal movement the fender at one end will be carried down near the rail, and that at the other will be brought up close under the body of the car.

The fender being arranged to slide longitudinally under the car-body, and being of the same construction at both ends, it follows that it is adapted for use, no matter in which direction the car is moving, and as the operator has absolute control of it by means of the sprocket mechanism, it may be very quickly moved down close to the rails or raised up again as desired. The device can be readily attached to any car and will in no way interfere with the brake or other mechanism beneath the car.

While I have shown the device extending the full length of the car and adapted to be drawn out in front thereof regardless of the direction in which the car is moving, I do not limit myself to this construction, as each end of the car may be provided with fenders operating in the same manner as the one described, but entirely independent of each other.

I have shown the device applied to an electric car, but it is applicable as well to cable and steam cars.

Having thus described my invention, I claim as new and desire to secure by Letters Patent—

1. The combination, with the car, of the longitudinally-movable rectangular frame provided with downwardly-curved ends, adapted, when the device is in use, to move over the rails in close proximity thereto, the netting provided at each end of said frame and supported wholly upon said frame, means at either end of the car for advancing or retracting the frame, hangers depending from the car-body adjacent to the curved ends of said frame and provided with rollers upon which said frame is movably supported, and stops for limiting the longitudinal movement of the same frame, all constructed and arranged substantially as described, whereby when the frame is moved longitudinally the fender at one end is carried down near the rails, and that at the other end is moved up over the supporting-rails and held under and near to the body of the car.

2. The combination, with the car, of the longitudinally-movable frame provided with downwardly-curved ends adapted, when the device is in use, to move over the rails in close proximity thereto, the netting provided at each end of said frame and supported wholly thereon, the cross-bar 9, the upright shafts provided at each end of said car, sprocket-wheels on the lower ends of said shafts, a sprocket-chain passing over said wheels and having its ends connected to said cross-bar 9, and wheels on the upper ends of said upright shafts, hangers depending from the car-body adjacent to the curved ends of said frame and provided with rollers upon which said frame is movably supported, and stops for limiting the longitudinal movement of said frame, all constructed and arranged substantially as described, whereby as the frame is moved longitudinally one of its ends will be brought close to the rails of the track and the other end will be moved up over the supporting-roller and held near to the under surface of the car-body.

In testimony whereof I have hereunto set my hand this 17th day of September, A. D. 1895.

ANTON KNOBLAUCH.

In presence of—
A. C. PAUL,
RICHARD PAUL.